(12) United States Patent
Wieclawski (10) Patent No.: US 6,908,155 B1
(45) Date of Patent: Jun. 21, 2005

(54) VEHICLE SEAT (75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 105 days.

(21) Appl. No.: 10/030,403

(22) PCT Filed: Jun. 21, 2000

(86) PCT No.: PCT/EP00/05776

§ 371 (c)(1), (2), (4) Date: Feb. 25, 2002

(87) PCT Pub. No.: WO01/03968

PCT Pub. Date: Jan. 18, 2001

(30) Foreign Application Priority Data

Jul. 9, 1999 (DE) ................ 199 32 214

(51) Int. Cl.[7] ............................... B60N 2/00
(52) U.S. Cl. ................ 297/341; 297/378.12
(58) Field of Search ............ 297/188.04, 257, 297/248, 232, 322, 378.1, 340–341, 316–318, 297/464, 478, 475, 378.12, 378.14, 378.13, 297/381, 380, 378.11; 296/65.01, 65.16–65.65

(56) References Cited

U.S. PATENT DOCUMENTS

| 1,636,078 | A | * | 7/1927 | Schreiber | 297/341 |
|---|---|---|---|---|---|
| 2,257,583 | A | * | 9/1941 | Wood | 297/341 |
| 2,591,426 | A | * | 4/1952 | Hadley | 297/341 |
| 2,795,265 | A | * | 6/1957 | Albrecht | 297/341 |
| 2,856,983 | A | * | 10/1958 | Probst et al. | 297/341 |
| 4,152,024 | A | * | 5/1979 | Farelli | 297/341 |
| 4,368,916 | A | * | 1/1983 | Blasin | 297/341 |
| 4,382,629 | A | * | 5/1983 | Froumajou | 297/322 |
| 4,568,106 | A | * | 2/1986 | Yokoyama | 280/807 |
| 4,623,192 | A | * | 11/1986 | Koide et al. | |
| 4,636,003 | A | * | 1/1987 | Siebler | |
| 5,397,167 | A | * | 3/1995 | Fourrey et al. | |
| 5,482,349 | A | * | 1/1996 | Richter et al. | |
| 5,531,503 | A | * | 7/1996 | Hughes | |
| 5,588,707 | A | * | 12/1996 | Bolsworth et al. | 297/378.12 |
| 5,871,255 | A | * | 2/1999 | Harland et al. | |
| 5,904,404 | A | * | 5/1999 | McCulloch et al. | |
| 5,941,602 | A | * | 8/1999 | Sturt et al. | |
| 5,979,985 | A | * | 11/1999 | Bauer et al. | |
| 6,070,934 | A | * | 6/2000 | Schaefer et al. | 297/14 |
| 6,089,641 | A | * | 7/2000 | Mattarella et al. | |
| 6,336,679 | B1 | * | 1/2002 | Smuk | 297/378.12 |
| 6,520,581 | B1 | * | 2/2003 | Tame | |

FOREIGN PATENT DOCUMENTS

| DE | 1 889 716 | 11/1963 |
|---|---|---|
| DE | 87 14 045.4 U1 | 4/1988 |
| DE | 198 36 919 C1 | 6/1999 |
| DE | 198 36 907 C | 11/1999 |
| EP | 0 943 483 A | 9/1999 |
| EP | 0 943 486 A | 9/1999 |
| FR | 2767097 A | 2/1999 |
| GB | 569532 | 5/1945 |

* cited by examiner

Primary Examiner—Milton Nelson, Jr.
(74) Attorney, Agent, or Firm—Bill C. Panagos (57) ABSTRACT A vehicle seat has a seat part and a backrest which can be folded over from a travelling position in the direction of the seat part. The seat part can be moved during the folding over.

23 Claims, 8 Drawing Sheets

VEHICLE SEAT

The present invention relates to a vehicle seat comprising a seat part and a backrest which can be folded over from a traveling position in the direction of the seat part. Such vehicle seats are generally known and can be used as front or rear vehicle seats. When used as a front vehicle seat, the folded over backrest can facilitate access to the rear of the vehicle if the vehicle is made with only two doors. When used as a rear vehicle seat or as a rear vehicle bench seat, the backrest is frequently made to fold over to enlarge the rear loading area of the vehicle.

It is the object of the present invention to provide a vehicle seat which allows an expansion of the loading surface and which has the lowest possible height in the folded over state.

This object is satisfied by the features of claim 1, and in particular in that the seat part can be moved forward away from the pivot point of the backrest during the folding over of the backrest. In accordance with the invention, the seat part is not—as generally usual—secured to the vehicle seat such that a longitudinal movement relative to the pivot point of the backrest is precluded, but the seat part is secured to the vehicle seat such that it can be moved forward and backward. In this way, the seat part can be moved forward when the backrest is being folded over such that the backrest, and in particular the cushioning of the backrest can dip into the region which has thereby become free. This has the result that the backrest can be put into an almost horizontal position, wherein at the same time a minimum height of the vehicle seat in the folded over state is achieved. It is sufficient here for the backrest to be pivoted about a single pivot axis during folding over.

Advantageous embodiments of the invention are described in the description, the drawings and the dependent claims.

In accordance with a first advantageous embodiment, the seat part can be pivoted about a horizontal axis. It is ensured in this way that a pivoting is also possible in addition to the movement of the seat part in the longitudinal direction so that the sitting comfort can be taken into account, on the one hand, and the seat part can be inclined when the backrest is folded over, on the other hand, such that in the folded over state space is provided for a headrest attached to the backrest.

The seat part can be guided in at least one rail in order to ensure a problem-free to and fro movement of the seat part during the folding over procedure. It is particularly advantageous if the seat part can be moved so far forward when the backrest is folded over, that the rear end of the seat part is positioned in the upper third of the folded over backrest. This variant takes into account that the thickness of the cushioning in a backrest normally reduces the most in the upper third. It is thus possible to fold the backrest over into an almost horizontal position, although the rear end of the seat part is still arranged beneath the backrest.

In accordance with a further advantageous variant, a belt lock of the seat, and preferably also a belt tensioning device of the vehicle seat, is secured to the seat part and can be moved together with this. In this way, the belt lock and the belt tensioning device are likewise moved away from the pivot point of the backrest when the backrest is folded over, whereby a free space is provided into which the backrest can dip during folding over. Since in modern vehicle seats, the cushioning of a backrest has a side support cushion which projects somewhat to the front at the side of the backrest, a collision of this support cushion with the belt lock or with the belt tensioning device would occur under certain circumstances when the backrest is being folded over. In accordance with the invention, however, such a collision is precluded, since both the belt lock and the belt tensioner are moved forward together with the seat part when the backrest is folded over.

It is advantageous for the seat part to be moved forward from the traveling position by a spring during the folding over of the backrest, since in this case only a folding over of the backrest has to take place, with the seat part then being automatically moved forward. It is advantageous in this respect if the spring acts only over a part of the movement of the seat part, since in this case one does not have to work against the force of the spring from the start during the folding back of the backrest, which increases operating comfort.

In accordance with a further embodiment of the invention, a blocking member can be provided at the vehicle seat which prevents the closing of a latching device of the seat part when the seat part is not located in its rear end position. It is ensured in this way that the latching device can only be actuated when the seat part has been properly displaced into its rear end position. It is in particular advantageous for the backrest to remain in a slanting position inclined somewhat to the front when the seat part is not properly latched, since it will be reliably and quickly recognized that the seat is not latched securely for use in this case.

A cable run is preferably provided between the seat part and the backrest of the vehicle seat in order to move the seat part into its rear end position during the folding back of the backrest. In this way, the seat part is automatically moved into its rear end position during the folding back of the backrest, with, however, no rigid coupling being present between these components. In this way, the backrest can also be folded over when the seat part cannot move forward, or not fully forward without damage occurring, due to an obstacle. It is preferred for the cable run to be tautened loosely, but in transport positions, both in the traveling position and in the folded over position of the backrest. It is ensured in this way that a stretching of the cable run, or of the components connected to it, over time has no influence on the actuation of the vehicle seat. In addition, a stretching which does occur is clearly reduced, since the cable run, or the components connected to it, are not constantly under stress.

A vehicle seat arrangement in accordance with the invention for the rear of a vehicle has two vehicle seats in accordance with the invention, between which a further vehicle seat is arranged whose seat part cannot be moved relative to its backrest, which can be folded over. It is taken into account in such a vehicle seat arrangement in accordance with the invention that the center seat of a rear vehicle bench seat in an automobile is usually somewhat less wide than the two adjacent seats, and that the backrest of such a center vehicle seat has no, or only slight, side support cushions so that, when the backrest of the center vehicle seat is folded over, no movement of the associated seat part is necessary in order to allow a folding over of the backrest into an almost horizontal position.

In accordance with a variant, at least one reception recess is integrated into the rear side of the backrest of the further or center vehicle seat in order, for example, to stow articles or to put beverages down in a secured manner. In this embodiment, the fact is utilized that the rear side of the backrest of the center vehicle seat can be used as a table when the backrest is folded over due to the horizontal position.

In the vehicle seat arrangement in accordance with the invention, the seat parts of all seats can form a substantially continuous bench seat, with it nevertheless being ensured in accordance with the invention that the two outer vehicle seats have side support cushioning on their backrest and thus increased comfort. It is naturally also possible to make the vehicle seat in accordance with the invention as a rear bench seat which has a particularly low height in the folded over state.

Figure 1:
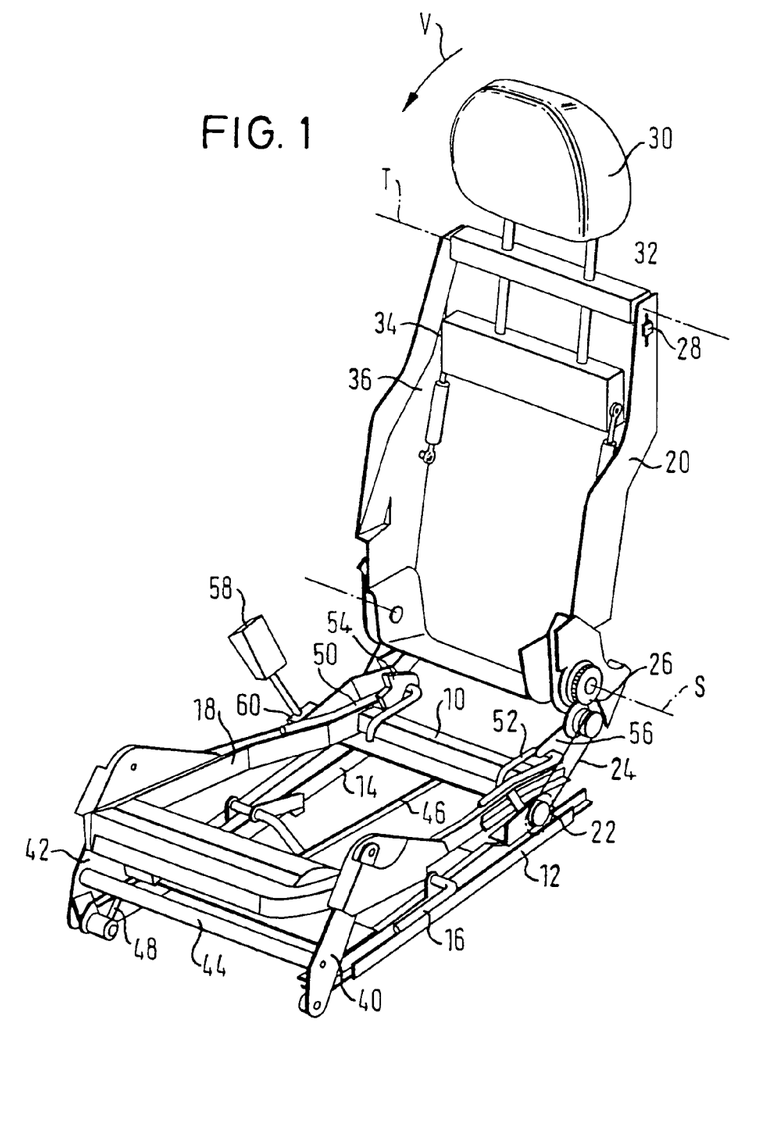
FIG. 1 a perspective view of a vehicle seat without cushioning and in the normal state.

The following invention will be described in the following purely by way of example with reference to advantageous embodiments and to the enclosed drawings. There are shown:

FIG. 1 shows a perspective view of a vehicle seat in accordance with the invention, with the cushioning of the seat not being shown for better understanding.

The illustrated vehicle seat has a base frame 10 which is mounted on two rails 12 and 14 and is displaceable in these. A detent can in this respect be released with the aid of an actuating lever 16 in order to displace the seat forward or backward in the rails 12, 14, as is generally known from the prior art. A seat part 18 and a backrest 20 are secured on the base frame 10 and are each provided with cushioning (not shown). The inclination of the backrest 20 relative to the base frame 10 can be adjusted via a handwheel 22. The handwheel 22 is—considered from the side—transposed to the front with respect to the lower end of the backrest 20 in order to allow easier operation. The movement of the handwheel 22 is transmitted via a transmission member 24 to an adjustment mechanism 26 which adjusts the inclination of the backrest 20 by a pivoting about a horizontal axis S.

The backrest 20 can be folded over from the traveling position shown in FIG. 1 in the direction of the seat part 18 by an unlocking button 28 being actuated which is arranged at the backrest 20 and which releases a locking bolt not shown in more detail such that the backrest 20 can be folded over in the direction of the seat part 18, with the backrest 20 being pivoted about the axis S.

The backrest 20 is provided with a headrest 30 which is secured to a carrier 32 which is integrated into the upper end region of the backrest 20. The carrier 32 can be pivoted about a horizontal axis T such that the headrest 30 can be pivoted about the axis T in the direction of the arrow V. A baffle plate 34 is arranged at the interior of the backrest 20 at the lower side of the carrier 32 and is covered by the cushioning (not shown) of the backrest 20. Furthermore, the unit consisting of the headrest 30, the carrier 32 and the baffle plate 34 is pre-tensioned into the position shown in FIG. 1 by a spring device 36. In the case of an accident, the occupant on the vehicle seat is pressed into the seat at high speed, whereby the vehicle occupant hits the baffle plate 34 with his back. A pivot movement of the carrier 32 about the axis T is thereby effected such that the headrest 30 is moved in the direction of the arrow V to allow an earlier impact point between the head of the vehicle occupant and the headrest 30.

It has to be stressed that the carrier 32 is integrated into the backrest 20, that is the carrier 32 does not extend over the full width of the backrest, but is received in a cut-out which is open toward the upper end face of the backrest. The backrest 20 can thus be cushioned and covered in a simple manner, since the sides of the backrest have no jointed parts.

As will be described in more detail in the following, the seat part 18 of the vehicle seat can be moved forward away from the pivot point (axis S) of the backrest during the folding over of the backrest 20 so that the folded over vehicle seat has a particularly shallow outer contour. For this purpose, the seat part 18, which is made as a substantially rectangular frame, is mounted at its front end on two rocker arms 40, 42 which are mutually connected via a bar 44. The two rocker arms 40, 42 are pivotally secured to the base frame 10 at their lower ends. The seat part 18 is hinged to each of the upper ends of the rocker arms. Furthermore, a further rail 46 is provided at the base frame 10 in the center between the rails 12 and 14. This rail 46 is made approximately square in cross-section, with one of the sides being slit so that a wheel can be moved in the interior of the rail 46, the wheel being connected to the rear end of the seat part 18. The seat part 18 can thus be moved forward out of the rear position shown in FIG. 1 by the rocker arms 40, 42 being pivoted forward, whereby the rear end of the seat part 18 moves in the rail 46. The reference numeral 48 designates a spring which, in the state shown in FIG. 1, presses against the bar 44 and thus against the rocker arms 40, 42, whereby the seat part 18 is subjected to a force in the forward direction.

As FIG. 1 further shows, two fastenings 50, 52 are secured to the rear end of the seat part 18 which have a substantially horizontally extending U-shaped section which interacts with a latching device 54, 56 which is secured to the base frame 10 and which effects a latching of the seat part 18 in its rear position shown in FIG. 1. The backrest 20 is unlocked by actuating the unlocking button 28, on the one hand, so that this backrest can be folded over, and the latching devices 54, 56 are unlocked, on the other hand, so that the fasteners 50, 52 are released and the seat part 18 can move forward from the position shown in FIG. 1. At the same time, the latching devices 54, 56 are designed such that the seat part 18 connected to the fasteners 50, 52 contacts a support in the latched state such that the weight of the vehicle occupant weighs on the support and not on the rail 46.

The reference numeral 58 designates a belt lock which is secured to a belt tensioner 60. The belt tensioner 60 is, however, not secured to the base frame 10, but to the seat part 18, that is the belt lock 58 and the belt tensioner 60 move together with the seat part 18.

Figure 2:
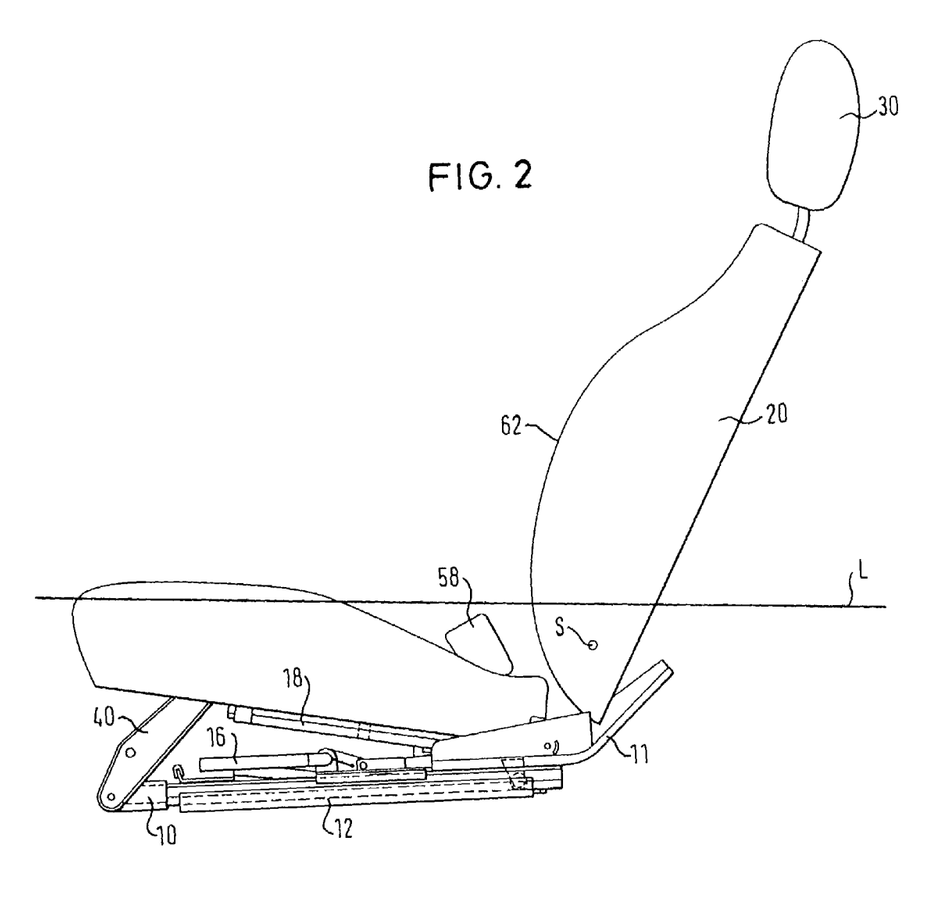
FIG. 2 a side view of a vehicle seat in the normal state.

FIGS. 2 to 5 show a side view of the vehicle seat of FIG. 1, with various parts being omitted for a simplified illustration. The cushioning of the backrest 20 and of the seat part 18 is illustrated, however. It can also be recognized in this respect that the backrest 20 has a side support cushion region 62 which serves for the side support of the vehicle occupant. Furthermore, a plan L is draw in FIGS. 2 to 5. This plane, which extends substantially horizontally, corresponds to an imagined load area of the vehicle which is to be enlarged by folding over the backrest 20. As FIG. 2 shows, the backrest 20 is inclined somewhat to the rear in the traveling position, with the inclination being variable by the handwheel 22 not shown in FIG. 2 and the adjustment mechanism 26. The seat part 18 is inclined to the rear relative to a horizontal plane and relative to the plane L and locked by the latching devices 54, 56 not shown in more detail in FIG. 2. The rocker arms 40, 42 are inclined to the rear by approximately 45° relative to the vertical in this seat position.

Figure 3:
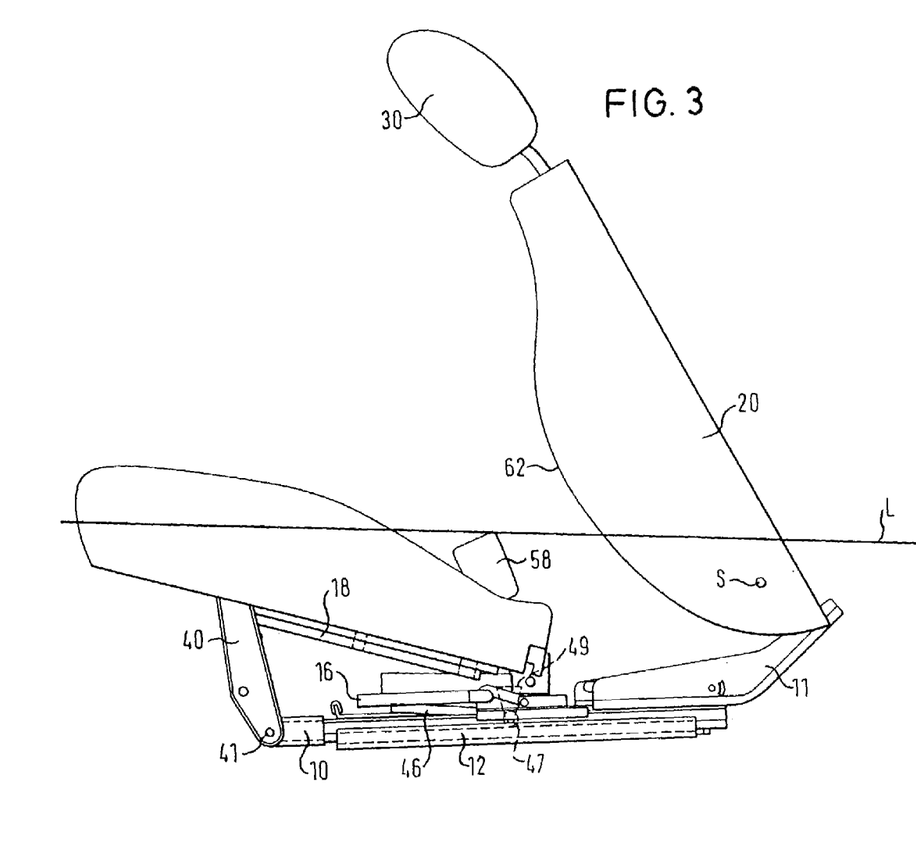
FIG. 3 a side view of the seat of FIG. 2 with partly folded over backrest.

FIG. 3 shows the arrangement of FIG. 2, with the backrest 20 already being partly folded over to the front after actuation of the unlocking button not shown in FIG. 3 and being pivoted by a corresponding angular region about the axis S. As can be recognized, the seat part 18 has moved forward in this position due to the force of the spring 48 (cf. FIG. 1), with the front end of the seat part 18 being pivoted about the pivot point 41 of the rocker arms 40, 42 and the rear end of the seat part 18 having been moved in a linear manner in the rail 46. In the illustration of FIG. 3, the wheel 47 can also be recognized which runs in the rail 18 and which is connected to the seat part 18 via a fastening arm 49. As a comparison of FIGS. 2 and 3 reveals, the seat part 18 has a larger inclination to the rear in the position of FIG. 3 than in the traveling position of FIG. 2. At the same time, it can be recognized that the upper fulcrum of the rocker arms 40, 42 has already passed its upper dead center and that the belt lock 58 has moved forward together with the seat part 18.

Figure 4:
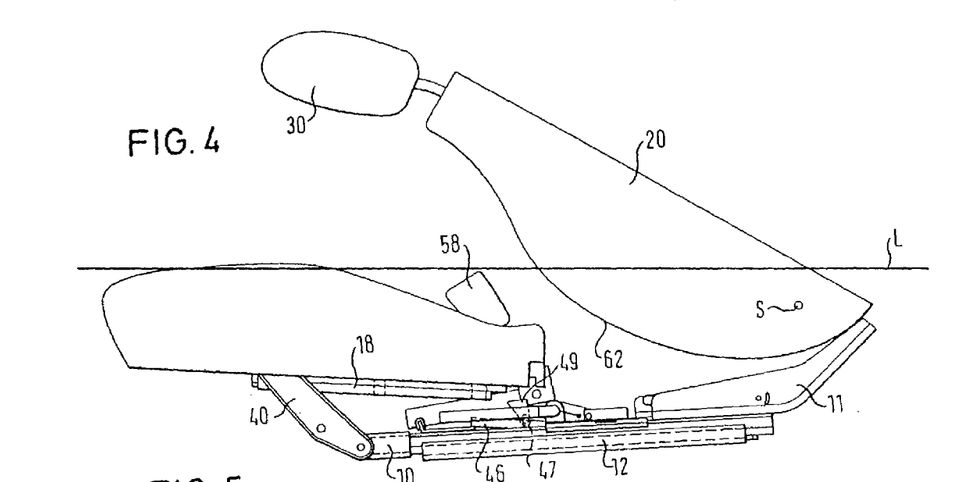
FIG. 4 the vehicle seat of FIG. 3 with a backrest folded over a little further.

FIG. 4 shows the illustration of FIGS. 2 and 3 after the backrest 20 has been folded over somewhat further forward. As can be recognized, the seat part 18 has again inclined somewhat to the front so that it has approximately the same inclination as in the traveling position of FIG. 2. At the same time, the support cushion region 62 of the backrest 20 is already beginning to dip into the free space which is created in that the seat part 18 has moved forward.

Figure 5:
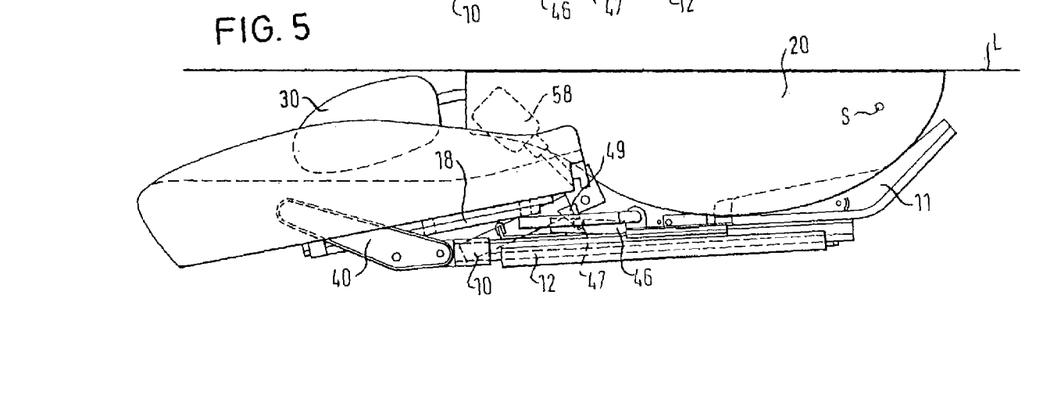
FIG. 5 the vehicle seat of FIGS. 2 to 4 with fully folded over backrest.

FIG. 5 shows the folded over end position of the backrest 20 in which its rear surface coincides with the plane L, that is the imagined loading area of the vehicle has been enlarged by the rear area of the backrest 20.

The seat part 18 has inclined forward in the end position shown in FIG. 5 such that the headrest 30 can dip into the free space thereby created. The rear end of the seat part 18 is in this respect located approximately at the height of the upper third of the backrest 20, which means that the belt lock 58 and the belt tensioner 60 have been moved along so far forward that a collision with the backrest 20 is precluded. As a comparison of FIGS. 2 and 5 show, the height of the fully folded over vehicle seat is less than the height of the seat part 18 (including cushioning) in the traveling position. In this way, the available loading space is maximized.

So that an automatic movement of the seat part 18 can take place when the backrest 20 is folded over from the traveling position and when the backrest 20 is folded back into the traveling position, a cable run is provided between the backrest 20 and the seat part 18, on the one hand, which guides the seat part back into its traveling position on the folding back of the backrest. The spring 48, on the other hand, serves to press the seat part 18 forward on the initial folding over of the backrest 20 from the traveling position. In accordance with the invention, however, a stop is provided in the region of the spring 48 which has the effect of the spring 48 no longer exerting any force onto the seat part 18 when the latter is approximately in the position shown in FIG. 3. In this position, the rocker arms 40, 42 have passed their upper dead center and the rocker arms fall down into the end position shown in FIG. 5 as a result of the dead weight of the seat part 18. This has the advantage that, when the backrest 20 is folded back, it is not necessary to work against the force of the spring 48 from the start. The seat part 18 is only subjected to the force of the spring in the position shown in FIG. 3. At this point in time, however, the folding back is already taking place at a certain speed such that the action of the spring is not negatively perceived by the operator.

Figure 6:
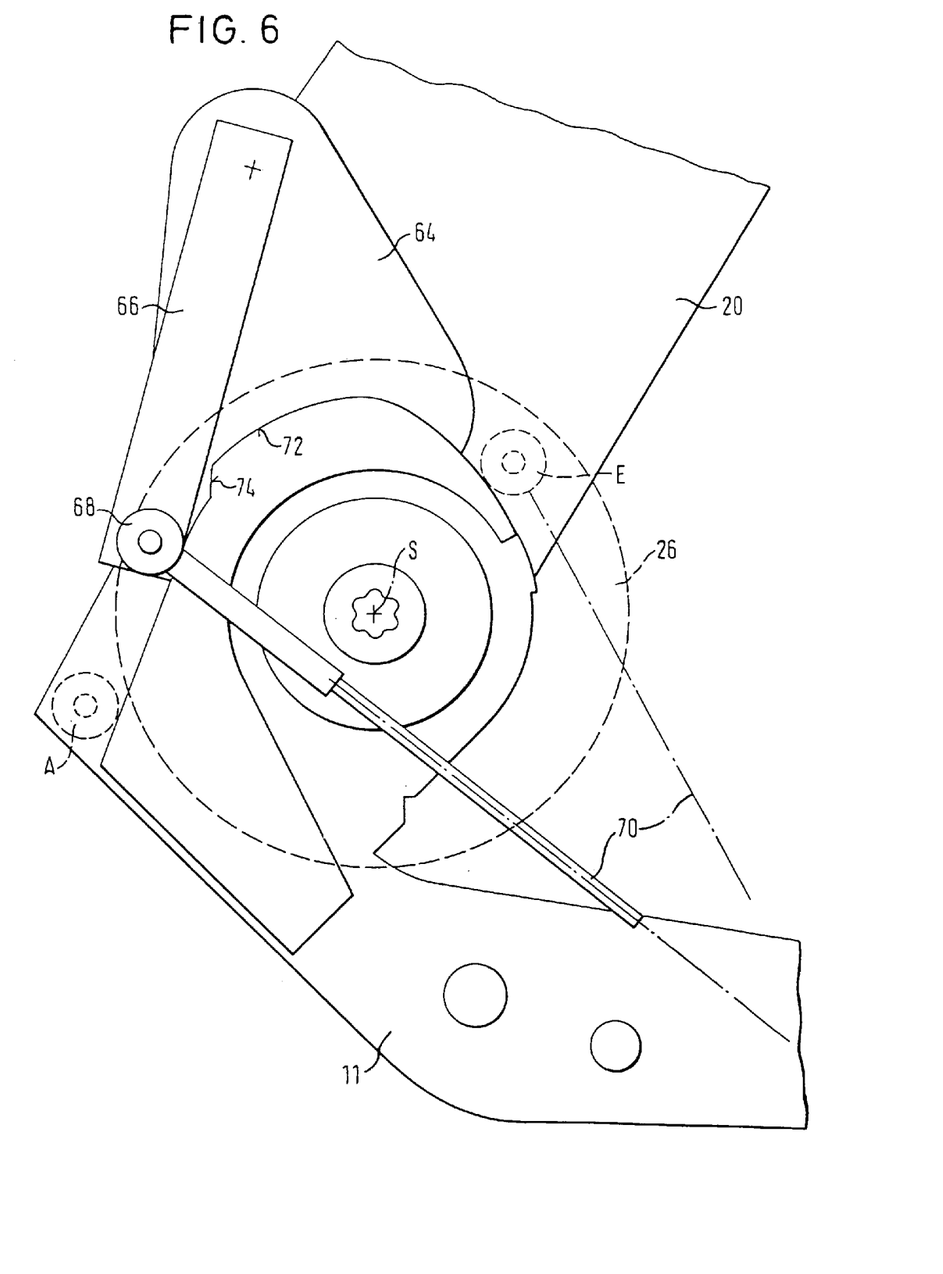
FIG. 6 an enlarged detailed view of the pivot region of the backrest.

FIG. 6 shows an enlarged detailed representation of that region of the vehicle seat in which the backrest 20 is hinged to the base frame 10. In FIG. 6, a carrier 11 of the base frame 10 can be recognized, to which the adjustment mechanism 26 is secured for the inclination adjustment of the backrest 20. Furthermore, a securing part 64 is shown which is secured to the backrest 20 and to which a pivot lever 66 is secured in a jointed manner, to whose outer end a wheel 68 and a pulley rope 70 are secured. The front end of the cable run 70 is secured to the rocker arm 42 such that a moving back of the seat part 18 takes place when the cable run 70 is tightened.

In FIG. 6, a cam track 72 can further be recognized on which the wheel 68 rolls off when the seat part 18 is folded over. The cam track 72 has a discontinuous point 74 at which the wheel 68 is moved in step-wise fashion, whereby a tensioning or a release of the cable run 70 is effected. In the normal position of the backrest 20, which is shown for example in FIG. 2, the wheel 68 is located in the starting position marked by A. In this position, the cable run 70 is slack. When the backrest 20 is folded over, the wheel 68 migrates along the cam track 72, with the cable run 70 being tensioned on passing through the discontinuous point 74 and remaining tensioned in the downstream part of the cam track 72. However, the cable run 70 is relaxed, that is slack, again in the end position of the wheel 68 marked by E. This means that when the backrest 20 is fully folded over (FIG. 5), the cable run 70 is initially slack and is only tensioned when the backrest 20 is folded back up. The seat part 18 must subsequently be raised against its dead weight by means of the cable run 70 by a further folding over of the backrest 20 until the spring 48 engages (cf. FIG. 3). However, in this position it is relatively easy for the operator to fold the backrest 20 fully over so that the spring force which comes into play does not impair the operating comfort. After the seat part 18 has adopted its fully moved back position and the fasteners 50, 52 of the latching devices 54, 56 have locked, the wheel 68 runs through the discontinuous point 74 (counter clockwise in FIG. 6), whereupon the cable run 70 is again relaxed. To ensure a contact of the wheel 68 at the cam track 72, the pivot lever 66 is spring-loaded.

Figure 7:
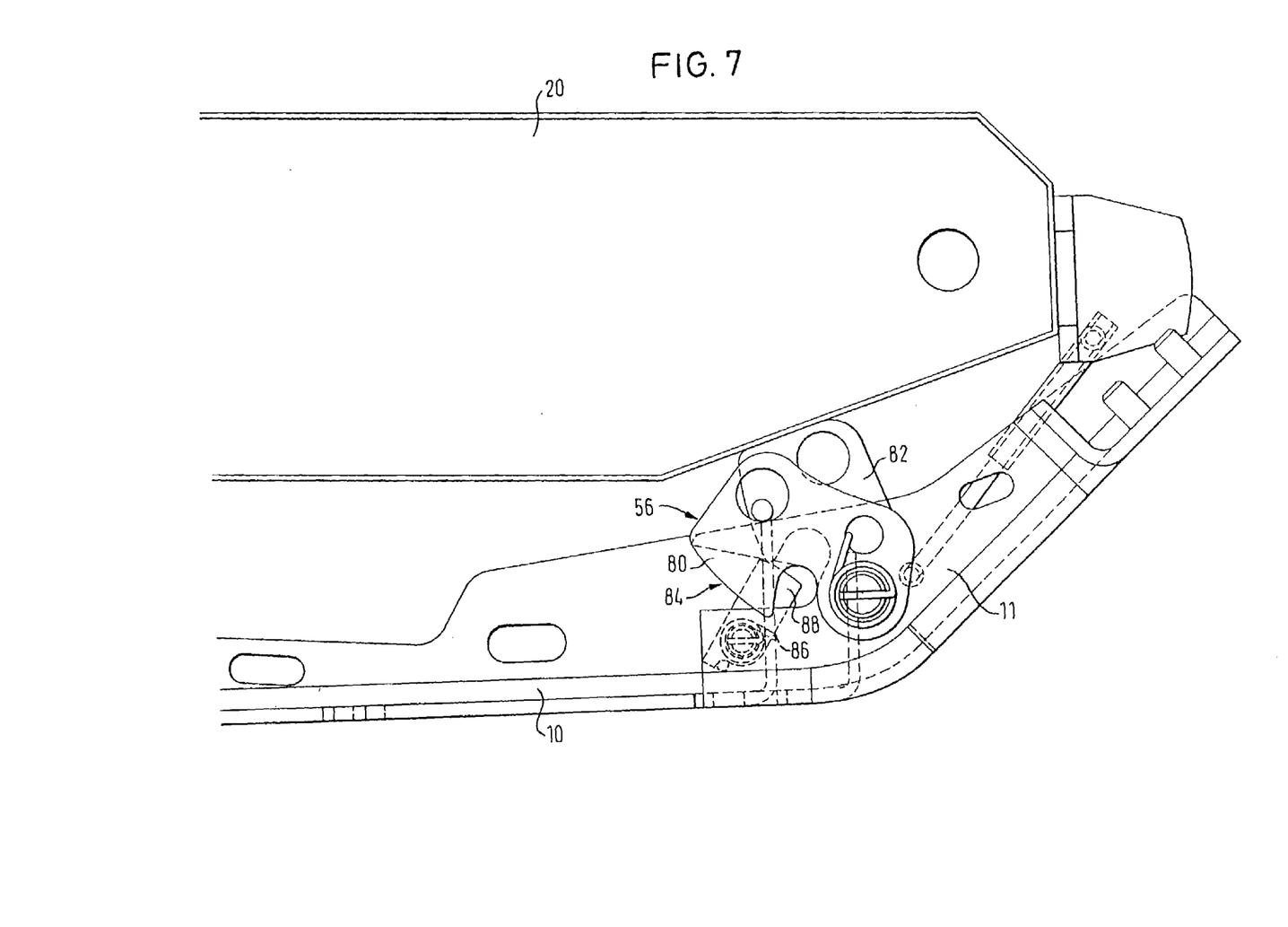
FIG. 7 a further enlarged detailed view of a latching device of the vehicle seat.

FIG. 7 shows an enlarged illustration of the latching device 56 which locks the fastener 52 of the seat part 18. The latching device 56 has two spring-loaded latch hooks 80, 82 which are mutually coupled and which provide a no-play locking of the fastener 52. When the seat part 18 is moved back into its traveling position, the fastener 52 (not shown in FIG. 7) runs into a locking mouth 84 secured to the base frame 10, whereupon the latch hooks 80, 82 snap downward and prevent a moving back of the fastener 52, with the latching unit 56 having a pre-locking position in which the fastener 52 is already locked as soon as it has reached its rear end position. Furthermore, a second final locking position is provided which is adopted when the backrest 20 is in its traveling position.

FIG. 7 furthermore shows a blocking member 88 which is loaded by a spring 86 and which prevents a closing of the latching device 56 when the seat part 18 or the fastener 52 of the seat part 18 is not in its rear end position. When the fastener 52 runs into the locking mouth 84, the blocking member 88 is pivoted against the force of the spring 86, whereupon the latching device 56 is released and the latch hooks 80, 82 can snap into place.

For the sake of completeness, it must be mentioned that the latching device 54 is designed in the same way as the latching device 56.

Figure 8:
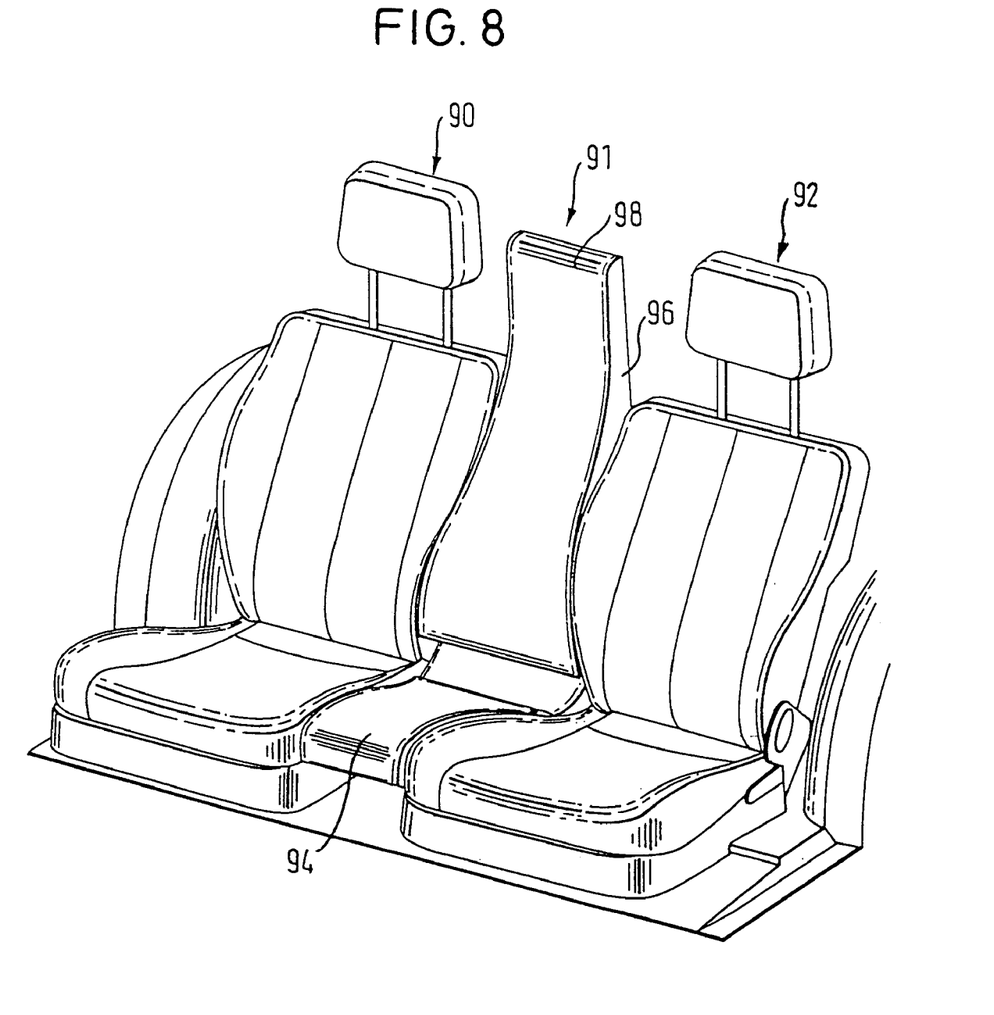
FIG. 8 a vehicle seat arrangement for the rear of a vehicle.
Figure 9:
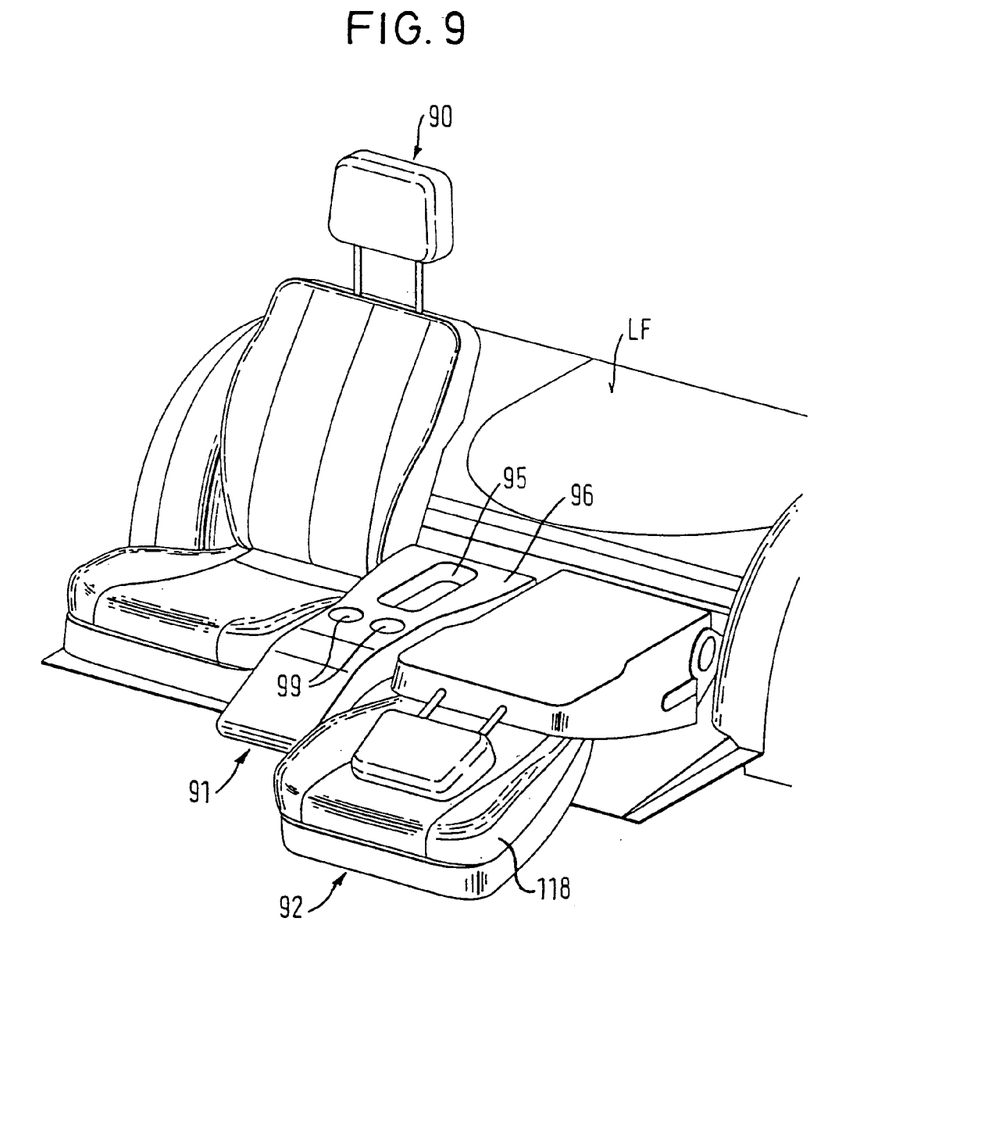
FIG. 9 the seat arrangement of FIG. 8, with two backrests being shown fully folded over.

FIGS. 8 and 9 show a vehicle seat arrangement for the rear of a vehicle, in which two vehicle seats 90, 92 of the kind described above are arranged in the rear of the vehicle, with a further vehicle seat 91 being arranged between the two vehicle seats 90 and 90 and its seat part 94 not being movable relative to the associated backrest 96 which can be folded over. The backrest 96 of the vehicle seat 91 has an integrated headrest 98 which is formed in that the backrest 96 constantly narrows toward the top and starting from the associated seat part 94. Furthermore, the backrest 96 is formed such that this is shaped in complementary fashion to the intermediate space which results between the two backrests of the vehicle seats 90 and 92.

FIG. 9 shows the arrangement of FIG. 8, with the backrest of the vehicle seats 91 and 92 being folded over. As can be recognized, the rear side of the backrest 96 of the center seat 91 extends substantially horizontally in the folded over state. The seat part 118 of the right hand, folded over vehicle seat 92 has been moved correspondingly forward.

A plurality of reception recesses 95, 99 are provided in the rear side of the backrest 96 of the center seat 91, that is the backrest 96 of the center vehicle seat 91 can be used as a table or as a beverage rest in the folded over state.

As FIG. 8 shows, the seat parts of all vehicle seats 90, 91 and 92 form a continuous bench seat. At the same time, the rear sides of the backrests of the vehicle seats 90 to 92 always extend the loading area LF of the vehicle.

What is claimed is:

1. Vehicle seat comprising a seat part and a backrest which can be folded over from a traveling position in the direction of the seat part, an actuator associated with the seat part to move the seat part forward away from the backrest without altering a height of a rear portion of the seat part during the folding over of the backrest.

2. Vehicle seat in accordance with claim 1, wherein the seat part is arranged in a pivotal manner about a horizontal axis.

3. Vehicle seat in accordance with claim 1, wherein the seat part is guided in at least one rail.

4. Vehicle seat in accordance with claim 1, wherein the seat part is inclined to the rear relative to a horizontal plane in the normal state and inclined to the front with the backrest folded over.

5. Vehicle seat in accordance with claim 1, wherein the seat part can be moved so far forward with the backrest folded over that the rear end of the seat part is positioned in the upper third of the folded over backrest.

6. Vehicle seat in accordance with claim 1, wherein a headrest arranged at the backrest is positioned approximately at the center of the seat part with the backrest fully folded over.

7. Vehicle seat in accordance with claim 1, wherein a belt lock and a belt tensioner are secured to the seat part and can be moved together with this.

8. Vehicle seat in accordance with claim 1, wherein the actuator is a spring.

9. Vehicle seat in accordance with claim 1, wherein the seat part is moved forward by means of pressing down of the backrest.

10. Vehicle seat in accordance with claim 1, wherein the seat part is locked in the traveling position and is unlocked by an unlocking device which at the same time unlocks the backrest.

11. Vehicle seat in accordance with claim 1, wherein the seat part is locked in the traveling position and is only unlocked by an unlocking device after a pre-determined folding over movement of the backrest.

12. Vehicle seat in accordance with claim 1, wherein a blocking member is provided which prevents closing of a latching device of the seat part and a locking of the backrest when the seat part is not in its rear end position.

13. Vehicle seat in accordance with claim 1, wherein a latching device of the seat part has a pre-locking position, in which the seat part is locked as soon as it has reached its rear end position, and a second end-locking position, which is set when the backrest is in its traveling position.

14. Vehicle comprising at least one vehicle seat in accordance with claim 1.

15. Vehicle seat in accordance with claim 1, wherein a cable run is provided between the seat part and the backrest in order to move the seat part into its rear end position during the folding back of the backrest and wherein the cable run is slack both in the traveling position and also in the folded over position.

16. Vehicle seat in accordance with claim 1, wherein a part of a cable run is guided between the seat part and the backrest via a cam which is made such that the cable run is slack in a starting position and a transport position and taut in transport positions.

17. Vehicle seat in accordance with claim 1, further comprising an adjusting mechanism to move the seat part forwardly and backwardly when the backrest is folded over.

18. Vehicle seat arrangement for the back of a vehicle, with two vehicle seats being provided in accordance with claim 1, between which a further vehicle seat is arranged, the seat part of which is not movable relative to its foldable backrest.

19. Vehicle seat arrangement in accordance with claim 18, wherein the backrest of the further seat has an integrated headrest.

20. Vehicle seat arrangement in accordance with claim 18, wherein the backrest of the further seat has an integrated backrest and constantly narrows in the direction of a headrest starting from the associated seat part.

21. Vehicle seat arrangement in accordance with claim 18, wherein the rear side of the backrest of the further seat is arranged substantially horizontally in the folded over state and wherein reception recesses are integrated into this rear side.

22. Vehicle seat arrangement in accordance with claim 18, wherein the seat parts of all seats form a bench seat.

23. A Vehicle seat comprising a seat part and a backrest which can be folded over from a traveling position in the direction of the seat part, wherein the seat part is movable in a forward direction away from a pivot point of the backrest during the folding over of the backrest and wherein a cable run is provided between the seat part and the backrest in order to move the seat part into its rear end position during the folding back of the backrest.

* * * * *